United States Patent [19]

Koizumi et al.

[11] 4,076,593
[45] Feb. 28, 1978

[54] METHOD AND APPARATUS FOR CONTROLLING HEAT INPUT TO A WASTE HEAT BOILER BY USE OF BLEEDER GAS FROM A COKE DRY QUENCHING STATION

[75] Inventors: Kunihei Koizumi; Takeshi Ueda, both of Yokohama; Tatu Otani, Yokosuka, all of Japan

[73] Assignee: Nippon Kokan Kabushiki Kaisha, Tokyo, Japan

[21] Appl. No.: 758,864

[22] Filed: Jan. 12, 1977

[30] Foreign Application Priority Data
Jan. 13, 1976  Japan ................................. 51-2424

[51] Int. Cl.$^2$ ............................................ C10B 39/02
[52] U.S. Cl. ..................................... 201/39; 202/228
[58] Field of Search ................... 202/227, 228; 201/39

[56] References Cited

U.S. PATENT DOCUMENTS 3,331,754  7/1967  Mansfield ........................ 202/228 X
4,009,080  2/1977  Kurokawa et al. .................... 201/29

FOREIGN PATENT DOCUMENTS 2,450,803  4/1975  Germany ............................. 202/227
  885,324  12/1961  United Kingdom ................. 202/227

Primary Examiner—Morris O. Wolk
Assistant Examiner—Arnold Turk
Attorney, Agent, or Firm—Moonray Kojima

[57] ABSTRACT

In a coke dry quenching system utilizing a waste heat boiler, the sensible heat of bleeder gas exiting from the top of a coke dry quenching station is stored in a regenerator, and when heat input to the boiler falls below a predetermined level the stored heat is conducted to the waste heat boiler, whereby substantially constant heat input to the boiler is maintained.

8 Claims, 2 Drawing Figures

METHOD AND APPARATUS FOR CONTROLLING HEAT INPUT TO A WASTE HEAT BOILER BY USE OF BLEEDER GAS FROM A COKE DRY QUENCHING STATION

BACKGROUND OF THE INVENTION

This invention relates to a method of controlling heat input to a waste heat boiler operated in conjunction with a coke dry quenching station, and more particularly, to such a method and apparatus wherein heat input to the waste heat boiler is maintained substantially constant and substantially independent of the amount of hot coke dumped into the station, by utilizing the sensible heat of bleeder gas exiting from the top of the station.

Hot coke taken from an oven is now quenched in a dry quenching system, such as depicted in FIG. 1. The prior system comprises a quenching station 1, wherein a vertical cooling chamber 2 is formed, and is connected to an external boiler 3 in which waste heat contained in the heat quenching gas from the quenching station 1 is used to produce steam and to be concurrently cooled and supplied again through recirculating passages 7, A and blower 4 to station 1 for quenching another charge of hot coke. The furnace 1 usually has a bleeder mechanism 12. Usually boiler 3 has coils 10 which contains heat exchanging medium such as water to cool the quenching gas coming from the furnace 1 after quenching hot coke, and by heat exchange the medium is turned into steam, for example, which is then utilized by utilization apparatus 11. In such a system, quenching gas if sent into the furnace 1 from an inlet located toward the bottom thereof by blower 4. Then, the gas is passed through the layers of hot coke dumped into the cooling chamber of the furnace and is heated by the sensible heat of the hot coke. Concurrently, the coke itself is cooled. Then, the heated quenching gas is drawn off from the upper portion of the cooling chamber and is conducted to the boiler 3 wherein the heat contained in the quenching gas causes the water in coil 10 to become steam and the quenching gas is cooled by heat exchanger action. The cooled heat exchanged quenching gas is then recirculated by blower 4 into chamber 2 via passage "A".

The waste heat boiler used in connection with the dry quenching system for coke, produces steam for power generation and other general plant uses, and cools the quenching gas, which cooled quenching gas is then recirculated to quench the hot coke. Provided the steam output is reliable and constant, this dual usage can be very profitable in terms of savings of energy and resources. Accordingly, smooth, reliable, and constant operation of the waste heat boiler is an important consideration, especially now in times of escalating energy costs. However, the present situation in the art is that it is very difficult to maintain constant the amount of steam produced by the waste heat boiler because of the difficulties in controlling the amount of heat taken from the quenching station, which heat depends to an extent upon the amount of coke supplied to the quenching chamber and the pushing interval of the charges of coke.

The amount of steam produced by the boiler is dependent upon the heat supplied to it by the heated quenching gas drawn from the quenching station after quenching. This heat input is related to the amount of hot coke dumped into the quenching station. Consequently, the number of calories of the heated quenching gas decreases as the dumped amount of hot coke decreases. Thus, the heat input to the boiler is lowered.

In the art, the following counter-measure has been taken to resolve the problem. The heat input to the boiler is controlled by adjusting the dumping interval into the quenching furnace and keeping the hot coke in the cooling chamber filled to a constant level. It is, however, well known that the pushing interval of hot coke taken from an oven is not always constant and the pushing schedule is often changed by various factors. Accordingly, when the pushing interval changes, the heat input to the boiler directly undergoes a change, and thus the amount of steam produced is lowered. It is thus unavoidable that such a reduction of steam brings about dropping of load for the generator and its power generation becomes unstable and unreliable. Thus, the problem of maintaining constant heat input to the waste heat boiler, and maintaining constant steam output, has still not been resolved in a satisfactory manner.

SUMMARY OF THE INVENTION

An object of the invention is to remedy the foregoing and other problems of the prior art.

Another object of the invention is to provide a new method for controlling heat input to a waste heat boiler to thereby stabilize the amount of steam produced from the boiler and to keep it at a constant level.

A further object of the invention is to provide a new method for controlling the amount of steam produced by the boiler for such uses as power generation and general plant use.

The foregoing and other objects of the invention are attained in a dry quenching system for coke, encompassing a quenching station, waste heat boiler, and a recirculating circuit for supplying quenching gas to the quenching chamber and after quenching supplying same to the boiler for cooling and causing production of steam, wherein bleeder gas from the quenching station is supplied to a regenerator means wherein the heat contained in the bleeder gas is removed and stored, and control means monitors the heat input supplied by the heated quenching gas to the boiler and responsive to a heat amount below a predetermined level cause the cooled gas taken from the boiler to be bypassed and led through the regenerator means for heating with the stored heat, and supplied to the input of the boiler thereby to keep substantially constant the input heat to the boiler and cause substantially constant steam production by the boiler.

A feature of the invention is a method and apparatus for maintaining the heat input to the waste heat boiler at a substantially constant level by using the sensible heat of bleeder gas exiting from a coke dry quenching station to compensate for any reduction of heat input to the boiler.

Another feature of the invention is the use of two or more regenerator means for storing heat contained in the bleeder gas and for burning any combustible components therein prior to release into the atmosphere, and for releasing the stored heat to recirculating gas which heated recirculating gas is then supplied to the boiler in an amount to keep substantially constant the heat input to the boiler.

A further feature is the selective application of bleeder gas to one or more regenerators to store different amounts of heat therein and selective application of the recirculating gas to one or more regenerators for the appropriate heating of the recirculating gas in an amount sufficient to maintain substantially constant heat at the input to the boiler.

DETAILED DESCRIPTION OF PREFERRED EMBODIMENTS

Figure 1:
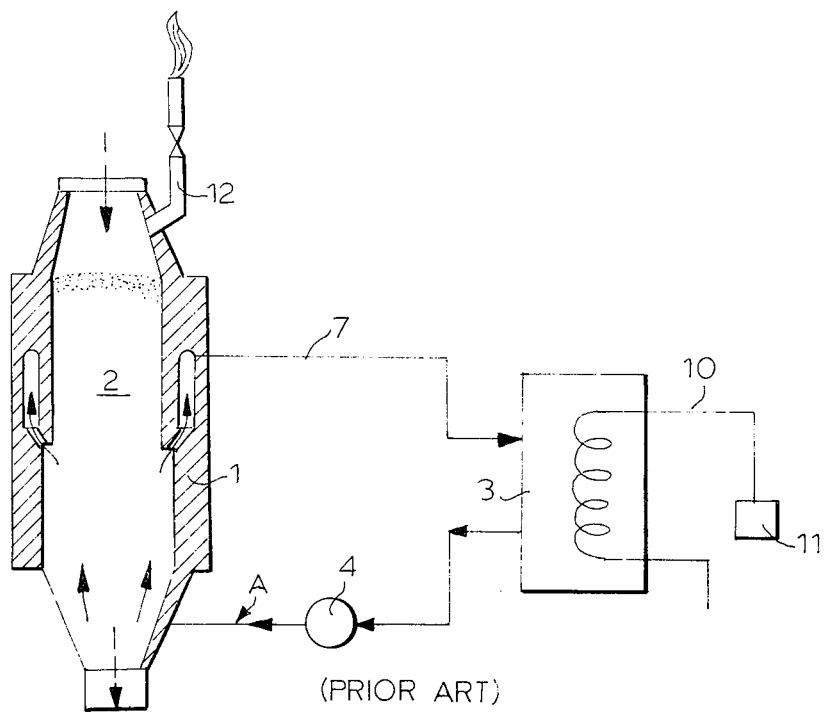
FIG. 1 depicts a prior art coke dry quenching station and a boiler supplied by the heated quenching gas drawn from the station.

The prior art system depicted in FIG. 1 has already been discussed and will not be discussed further. It should be noted that similar, although not necessarily the same, parts bear the same numerical designations in both figures.

Generally, the quenching furnace in the coke dry quenching station is operated with an internal pressure in the upper portion of the cooling chamber within the range of 0 to +5 mm $H_2O$. Accordingly, normally excess gas is bled through the bleeder pipe disposed toward the top of the station furnace. This bleeder gas shows a high temperature; its sensible heat is high; and it comprises a substantial amount of inflammible or combustible components. This invention has been developed taking into account the above properties of the bleeder gas. In the invention, the sensible heat of the bleeder gas is stored in one or more regenerators. Then, the stored heat is used to further heat recirculating quenching gas which is fed to the boiler and thereby bring the supplied heat up to the level required for the boiler, to maintain substantially constant steam production.

Figure 2:
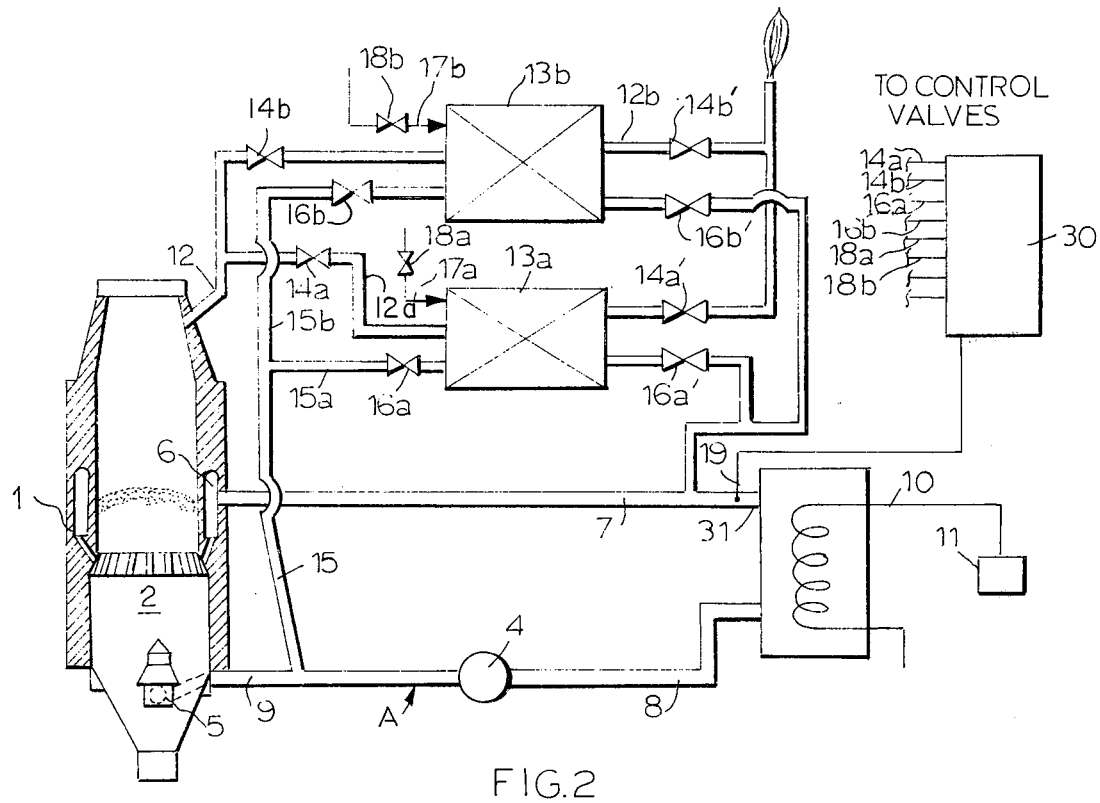
FIG. 2 depicts an illustrative embodiment of the invention.

Referring to FIG. 2, a coke dry quenching station is depicted comprising a quenching furnace 1 in which is formed a cooling chamber 2, an inlet 5 for cooled quenching gas, an outlet 6 for heated quenching gas, and a bleeder outlet to which is connected pipe 12, and a waste heat boiler 3 having an inlet 31, and contained therein coil 10 containing a heat exchange medium, such as water, and a utilization apparatus 11. Interconnecting outlet 6 for the heated quenching gas, boiler 3, blower 4, and inlet 5 are ducts or pipes 7, 8, A and 9, as depicted. These pipes collectively are the recirculating circuit for the quenching gas wherein pump 4 pumps cool quenching gas through passage A, pipe 9, into inlet 5 for cooling hot coke dumped into cooling chamber 2 of furnace 1, and the heated quenching gas, which was once considered waste material, is drawn out of outlet 6 through pipe 7 and into inlet 31 of boiler 3 for cooling by the heat exchange medium in coils 10, and after cooling the quenching gas is again pumped into pipe 8, etc to quench another charge of hot coke. The heat exchange medium in coil 10 is turned gaseous, such as steam by the heat exchange and is supplied to the utilization circuit 11. The heat exchange medium is supplied by a suitable source not shown disposed at the unconnected end opposite the utilization apparatus 11.

Thus, in operation, hot coke is dumped through the top of furnace 1 wherein the dumped hot coke is cooled by the recirculating gas supplied through inlet 5 from boiler 3 wherein it is cooled by heat exchange with the heat exchange medium in coil 10, via pipe 8, blower 4, passage A, pipe 9. Concurrently, the quenching gas is heated to absorb the heat from the coke, and is drawn off through outlet 6 through pipe 7 back into the inlet 31 of boiler 3 for cooling. The cooled coke is removed from the bottom of chamber 2. The heated quenching gas is then cooled by heat exchange in boiler 3, and the heated heat exchange medium, such as water, becomes steam, and is then utilized by apparatus 11.

In this invention, first, the sensible heat of the bleeder gas which in FIG. 2 exits through pipe 12, is stored in one or more regenerators and then when a shortage of heat input to the boiler occurs, the recirculating quenching gas is bypassed through the regenerators to become heated by the stored heat, and then supplied to the boiler so that the input heat to the boiler is maintained substantially constant.

One or more regenerators, which may be of the usual brick type, are arranged in the gas bleeder circuit. In FIG. 2, two switching type regenerator means 13a and 13b are disposed in two branches 12a, 12b of the bleeder circuit 12. At the front end and at the rear end of the regenerators in each branch are control valves 14a, 14a' and 14b, 14b', respectively. A bypass circuit 15 from the recirculating circuit A, 9 providing cooled quenching gas to inlet 5 of furnace 1, is provided in two branches 15a, 15b connected through control valves 16a and 16b to regenerators 13a and 13b, respectively. At the rear of the two regenerators 13a, 13b, are provided the other parts of the bypass circuit connected to control valves 16a' and 16b' respectively, and into the pipe 7 at inlet 3 of boiler 3. Of course the depiction is only illustrative, and the control valves can be located anywhere along the circuit to provide the desired functions.

Also, near the inlet is a heat sensing device 19 which is connected to control cirucit 30. The control circuit 30 is also connected to all of the valves 14a, 14a'; 14b, 14b'; 16a, 16a'; 16b, 16b', 18a, 18b, for suitable selective operation, such as opening and closing, of the valves depending upon the heat or temperature measured by the heat detecting device 19. Valves 18a, 18b control the air supplied through inlets 17a, 17b to the regenerators 13a, 13b. Although the control circuit 30 does not show means for controlling the valves, such as means for opening and closing the valves responsive to the temperature at the input 31 and for other desired conditions, it is to be understood that the control circuit includes the necessary devices and mechanism to effect the desired control of the valves and the monitoring of the heat input to the boiler and regenerators. The control circuit 30 is connected to and control the various valves, and such connection is shown only illustratively. The control circuit elements are known in the art. The detecting device 19 is also known in the art. Any skilled worker should be able to construct such circuits given the parameters of this specification.

The inventive system and method of operation are as follows. When the boiler 3 is normal, which normal heat is detected by detector 19, at the inlet 31 of boiler 3, control system 30 causes valves 16a, 16a' of bypass branch 15a and control valves 16b, 16b' of bypass branch 15b to be closed; and control valves 14a, 14a' of bleeder branch 12a and control valves 14b, 14b' of bleeder branch 12b to be opened, and control valves 18a, 18b to be opened and air to be supplied into the regenerators 13a and 13b through pipe 17a, and 17b. Bleeder gas is supplied to each of the regenerators via circuit 12, 12a, valve 14a, regenerator 13a, valve 14a' and vented into the atmosphere; and the circuit 12, 12a, valve 14b, regenerator 13b, valve 14b and vented into the atmosphere. Thus bleeder gas which has contained therein substantial sensible heat and at a high temperature of more than 1,000° C, in many cases, is lead into the regenerators 13a,13b wherein the heat is removed and stored in the regenerators. Concurrently, and advantageously, combustible and inflammable material contained in the bleeder gas is burned and the heat therefrom is also stored in the regenerators. Thus, advantageously, the invention prevents venting of harmful components into the atmosphere, such as CO gas, and effectively prevents environmental pollution at the same time making the consumption of energy more efficient. The control system 30, may selectively supply different amounts of bleeder gas to the different regenerators to store different amounts of heat therein.

Next, when detector 19 detects the heat input to boiler 3 to be lower than a predetermined amount or level, control system 30 will open control valves 15a,16a', 16b,16b' of the bypass circuit 15a,15b, and close control valves 14a,14a', 14b,14b' of the bleeder circuit 12a,12b. Thus, bypass circuit 15 from pipe A is opened. Quenching gas is bypassed at least partly, through pipe 15, pipe 15a, valve 16a, regenerator 13a, valve 16a', pipe 7 into inlet 31 of boiler 3, and through pipe 15, pipe 15b, valve 16b, regenerator 13b, valve 16b', pipe 7, and inlet 31 of boiler 3. The heat stored in the regenerators 13a,13b then heats up the quenching gas and the heated quenching gas is supplied to the boiler 3 in selected amounts to cause the input heat at the boiler input 31 to be maintained substantially constant.

Although the above discussion is direct to use of both regenerators, it is to be understood that any one or more regenerators singly or in combination, may be used selectively under the control of control system 30 in conjunction with the heat detector 19. For example, different amounts of heat can be stored in different regenerators and in response to the heat reduction at the input of boiler 3, as measured by detector 19, the recirculating gas can be suitably led to a regenerator having the desired amount of stored heat which stored heat then may be transferred to the recirculating gas and supplied to the boiler. Moreover, the use of the bleeder gas can be for any condition of heating at the inlet 31, at or above a predetermined level, to heat the regenerators. It is important that when the heat at the inlet 31 of boiler 3 falls below that predetermined amount or level, the recirculating gas be heated by the stored heat in the regenerators to make up for the heat shortage. Also, by using different flow circuits, the bleeder gas may be supplied continually to the regenerators, even when the recirculating gas is being heated by the regenerators, and need not be turned off during the heat transfer to the recirculating gas.

The foregoing description is illustrative of the principles of the invention. Numerous other variations and modifications thereof would be apparent to the worker skilled in the art. All such variations and modifications are to be considered to be within the spirit and scope of the invention.

What is claimed is:

1. In a coke dry quenching system having a waste heat boiler wherein heated quenching gas drawn from the quenching station is cooled and recirculated for use in subsequent quenching operations, and having means for bleeding gas from the top of the quenching station, the method of controlling heat input to said boiler comprising the steps of A. passing said bleeder gas through regenerator means for storing heat contained in said bleeder gas in said regenerator means;

B. measuring the heat input to said boiler;
    C. redirecting at least part of said recirculating quenching gas after cooling in said boiler to said regenerator means when heat input to said boiler is below a predetermined level;
    D. heating said recirculated quenching gas in said regenerator means using said stored heat from said bleeder gas; and
    E. supplying the recirculated gas after heating in said regenerator means to the input of said boiler thereby to maintain substantially constant the heat input to said boiler.

2. The method of claim 1, wherein said regenerator means comprises at least two regenerator units and said bleeder gas is fed selectively into said regenerator units to store heat selectively therein, and said recirculated gas is fed selectively into said regenerator units depending upon the temperature of the recirculating gas.

3. The method of claim 1, wherein said bleeder gas is applied through said regenerator means wherein heat stored therein is exchanged and any combustible material contained therein is burned, and thereafter said bleeder gas is bled into the atmosphere.

4. In a dry quenching system for coke comprising a quenching furnace having an inlet for cooled quenching gas; an outlet for removal of heated quenching gas; and an outlet for exit of bleeder gas; a waste heat boiler comprising an inlet for feeding heated quenching gas, a fluid heat exchanging medium, and an outlet for removing cooled quenching gas; first communicating means for connecting said furnace heated quenching gas outlet to said inlet of said boiler; second communicating means for connecting said furnace inlet to said outlet of said boiler; and pumping means in said second communicating means for causing flow of said cooled quenching gas from said outlet of said boiler to said inlet of said furnace; the improvement comprising A. regenerator means for storing heat;
    B. first connecting means for selectively connecting said bleeder gas outlet of said furnace to said regenerator means for storage of heat contained in said bleeder gas;
    C. second connecting means for selectively connecting said regenerator means to said second communicating means and for connecting said regenerator means to said inlet of said boiler; and
    D. control means for measuring heat input to said boiler and in a first condition when said heat input to said boiler is at or above a predetermined level to selectively switch the first connecting means to cause bleeder gas to be fed to said regenerator means to thereby store therein heat contained in the bleeder gas and in a second condition when said input heat to said boiler is below said predetermined level to selectively switch said second connecting means to cause at least part of said cooled quenching gas from the outlet of said boiler to be fed into said regenerator means through said second connecting means and become heated by the stored heat and thereafter to supply the heated quenching gas from said regenerator means to said input of said boiler whereby substantially constant heat input to said boiler is maintained.

5. The system of claim 4, wherein said regenerator means comprises at least two regenerator units and said control means operates to have the same or different amounts of heat stored in each regenerator unit, and depending upon the amount of heat required to make up for reduction of heat at the boiler input to cause said cooled quenching gas in said second communicating means to be heated in the regenerator unit having the desired amount of heat.

6. The system of claim 4, wherein said control means comprises heat detecting means disposed at the inlet of said boiler, valve means at each of said first and second connecting means, and control circuit for selectively operating said valves in response to changes in input heat as measured at said boiler input by said heat detecting means.

7. The system of claim 4, wherein said regenerator means comprises brick.

8. The system of claim 4, wherein said regenerator means includes air inlets for the introduction of air to burn combustible material in said bleeder gas prior to release into the atmosphere.

* * * * *